UNITED STATES PATENT OFFICE.

GEORGE WINTERS PALMER, OF SEATTLE, WASHINGTON.

PROCESS FOR PRODUCING ALCOHOLIC SPIRITS.

No. 825,342.

Specification of Letters Patent.

Patented July 10, 1906.

Application filed September 11, 1905. Serial No. 278,009.

*To all whom it may concern:*

Be it known that I, GEORGE WINTERS PALMER, a citizen of the United States, residing at Seattle, in the county of King and State of Washington, have invented new and useful Improvements in Processes for Producing Alcoholic Spirits, of which the following is a specification.

This invention is a process for producing alcoholic spirits from sugar and bran, preferably wheat-bran and ordinary sugar, although applicable to the use of molasses or other saccharine substances.

The object of the invention is to produce an improved novel fermenting agent and process in making a mash for distillation and useful for either sweet or sour mash spirits, although particularly applicable to the latter.

It is requirement of the United States revenue laws that the mash should not be "robbed" or "stuffed"—that is, taken from or added to—during the fermenting period. Hence it is essential for a practicable distilling process that it shall not require the addition of the fermenting agent after the mash is set, as is necessary to be done under some processes. The present invention also has the advantage that it is simple and cheap as compared to other processes of producing whisky and the like, and it is better and cheaper than fermentation produced by the use of hop-and-malt yeast.

In the practice of the process I first make a yeast of, say, five gallons of hot water, ten pounds of sugar or other saccharine matter, and five pounds of wheat-bran, which are stirred together and set aside to ferment, which usually takes from five to eight days, no other matter or yeast of any kind being required or added, after which it should stand one or two days to become quite sour. Then it is ready for use as a fermenting agent for the first or sweet mash. Then a mash is made of any desired quantity of water—say from one to five hundred gallons—which is used quite hot, but not boiling. In this is dissolved three to five pounds of sugar to the gallon. To this is stirred in three to five pounds of wheat-bran to the gallon, and the mash is then run into the fermenting-tub. Then the yeast previously prepared is poured into the mash. No grain or malt of any kind is used, the mash being made wholly of sugar, bran, and water. This yeast contains sour bran, which sinks to the bottom and at once becomes a fermenting agent, so that within an hour violent fermentation is in progress. The complete fermentation requires about seventy-two hours, after which the mash is run out for distillation, retaining in the tub a few gallons of the fermented mash to start and quicken the fermentation in the new or sour mash, after which the sour-mash process may be continued indefinitely. When the small quantity of fermented or sour mash retained in the tub comes in contact with the sweet bran, it starts at once an active fermentation, which is complete in about seventy-two hours. As good a result could be reached if the full mash were set sweet to start with, but the full fermentation would require from five to eight days instead of three days. Therefore the small quantity of sour mash left in the tub quickens the fermentation and shortens the period.

It is unnecessary to add yeast to the mash during the fermentation described above. On distillation of the fermented liquid a fine grade of spirits or whisky will be produced.

It should be stated that neither the yeast nor the mash should be boiled, since I have found this destroys its fermenting qualities. Spirits produced in this way will be free from deleterious substances and much cheaper in production than when grain is used in the ordinary way.

What I claim as new, and desire to secure by Letters Patent, is—

1. A sour-mash process of producing spirits without the use of grain or malt, consisting in adding a new or sweet mash composed of bran, sugar and water, to a retained portion of the old or sour mash composed of the same ingredients fermented.

2. The process of producing spirits consisting in preparing and heating a mash formed of water, sugar, bran, and then starting rapid fermentation by the addition of a yeast composed of water, sugar and bran previously fermented and soured.

In testimony whereof I have signed my name to this specification in the presence of two subscribing witnesses.

GEORGE WINTERS PALMER.

Witnesses:
 E. J. BANKS,
 C. C. TOWNSEND.